Patented Dec. 11, 1923.

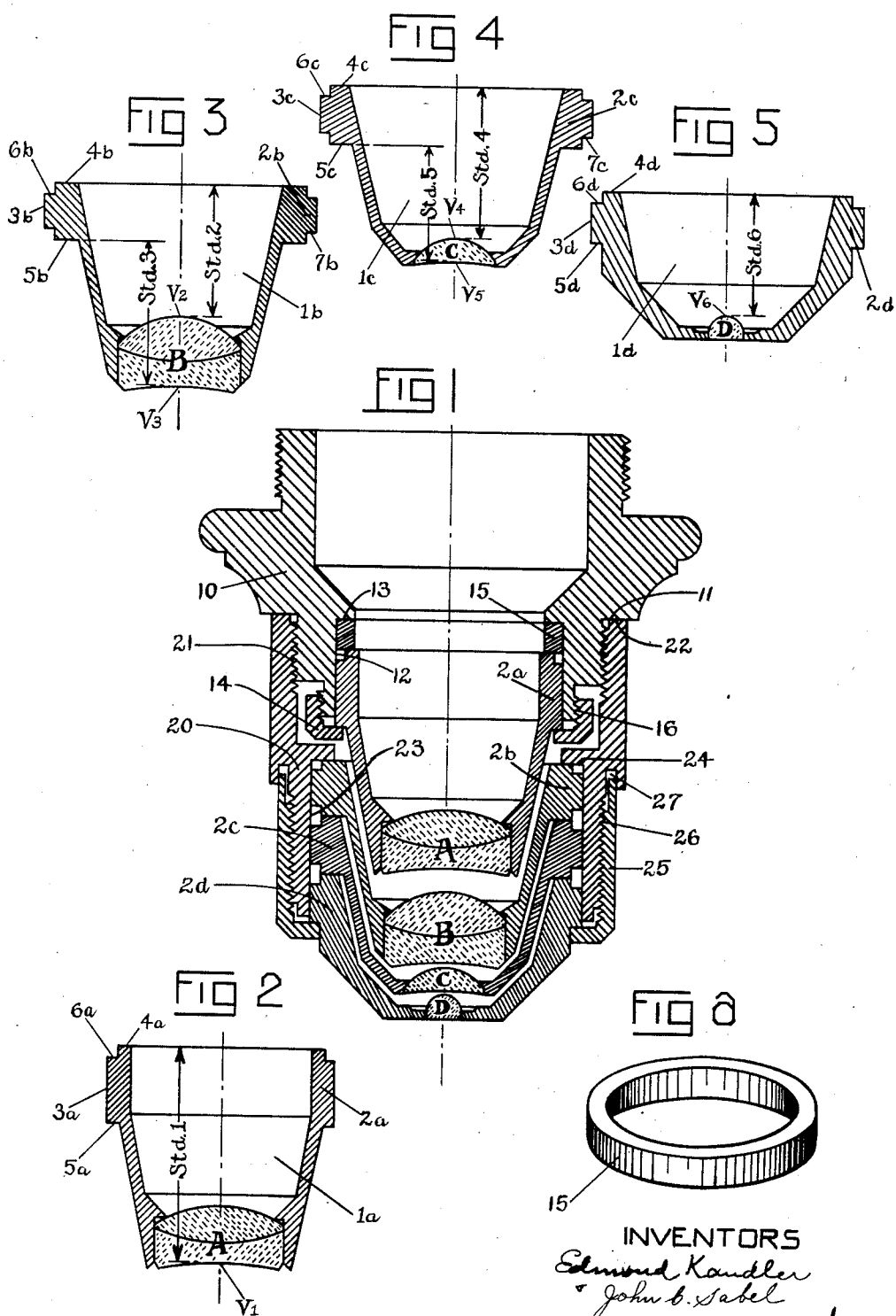

1,476,717

UNITED STATES PATENT OFFICE.

EDMUND KANDLER AND JOHN C. SABEL, OF ROCHESTER, NEW YORK, ASSIGNORS TO BAUSCH & LOMB OPTICAL COMPANY, OF ROCHESTER, NEW YORK, A CORPORATION OF NEW YORK.

MOUNTED OPTICAL SYSTEM.

Application filed August 6, 1920. Serial No. 401,587.

*To all whom it may concern:*

Be it known that we, EDMUND KANDLER and JOHN CHARLES SABEL, citizens of the United States, residing at Rochester, in the county of Monroe, State of New York, have invented certain new and useful Improvements in Mounted Optical Systems; and we do declare the following to be a full, clear, and exact description of the same, reference being had to the accompanying drawings, forming a part of this specification.

Our invention relates to mountings for and a method of mounting optical systems and it has for an object to simultaneously improve the excellence and facilitate the manufacture of mounted lens systems.

To these and other ends which may appear from a consideration of the subsequent detailed description, our invention consists jointly and severally in the structure and in the method hereinafter disclosed and claimed.

The various members of an optical system when ready for mounting, may be regarded as exact in all respects save in the absolute accuracy of their linear dimensions and their geometrical and optical concentricity. This is the case in the making of such optical elements as lenses and especially when producing them in quantities and by methods consistent with the requirements of manufacture, a reasonable tolerance of error in the linear dimensions and the eccentricity of the geometrical and optical axes of the individual lens components of the system (which errors may be compensated for in the operations incidental to mounting and organizing the system) greatly facilitating the satisfying of certain critical requirements, which, if not sufficiently exact, cannot be compensated for.

Thus, in the making of the lenses for a lens system, the axial thickness of each individual lens glass is subordinate to the requirements of the refracting surfaces of the lens, and therefore, perfection of surface polish, exactness of curvature and accuracy of concentricity of the refracting surfaces are insisted upon at the expense, if necessary, of the accuracy of the axial thickness. This thickness error, among others sometimes inherent in the lens system, may be corrected by altering the air spaces between the various lens members. Regarding the geometrical and optical concentricity, since it is easier and more accurate to center a lens, especially a cemented combination, while lodging it in its final setting, such compensation as may be obtained in this operation is depended upon for delicately centering the lenses of the system relatively to one another.

In the mounting or reconstructing of a delicate, critical lens system such as a microscope objective, wherein a minute error of any sort causes a large optical disturbance, the errors usually tolerated in the individual lenses of the system must be accurately compensated for when they are combined to form the objective. This requires a centering adjustment of each lens and a separation adjustment co-ordinating all the lenses of the system, to be made by modifying parts of the mounting while organizing a set of lenses and mounting parts into a finished objective.

With the forms of mountings now in use (of which the successively jointed screw threaded mounting and the series of simple annular cells ranged successively within a common cylindrical bore, may be taken as typical) the mounting and organizing of a delicate critical lens system is tedious, slow, expensive and difficult skilled work.

By our present invention, a lens system, or a quantity of lens systems, may be mounted and organized on a manufacturing basis. Further, each of the members of the system which ordinarily are uncoordinated, is rendered into a co-ordinated unit which may be interchangeably substituted for another similar unit, the correction adjustment being facilitated and the mounting being generally improved.

We have selected as a specific example for the purpose of illustration and detailed description, the practical application of our invention to a microscope objective, and therefore, in the drawings: Figure 1 is a section of a high power microscope objective constructed in accordance with our invention, the view being taken in a plane of the objective's optical axis; Figures 2 to 5 are views illustrating the organization and co-ordination of units of the objective system, and certain characteristic features thereof; and Figure 6 is a perspective view of one of the separation rings.

In the present embodiment of our invention illustrated in the drawings, the A, B, C and D lens members of the objective system may be regarded as a system consisting of two parts, the A lens constituting one part, the B, C and D lenses constituting the other part.

Thus, if the separation distances between the B, C and D lenses are maintained normal, any error in the axial thicknesses of these lenses may be compensated for by modifying the separation distance between the A lens and the B lens. Therefore, the B, C and D lenses are each mounted respectively in an individual cell, and the cell of each lens is so co-ordinated to the thickness of its lens, that when these lenses are produced and mounted in quantities, any combination of B, C and D lenses may be grouped together as a standard composite unit consisting of a group of individual units, and when combined with any A lens intended for use in this system, a simple adjustment of the separation between the A and B lens will at once correct for the errors of axial thickness in the entire system, and such other errors as this adjustment affords compensation for.

The individual cells for the A, B, C, and D lenses are denoted in the drawings by the reference characters $1^a$, $1^b$, $1^c$ and $1^d$ respectively. They are, generally, tubular or annular in form and are each provided with an annular centering rim denoted respectively by the reference characters $2^a$, $2^b$, $2^c$ and $2^d$, having respectively the peripheries $3^a$, $3^b$, $3^c$ and $3^d$, and having arranged at opposite ends the abutment shoulders respectively denoted $4^a$, $5^a$, $4^b$, $5^b$, $4^c$, $5^c$ and $4^d$, $5^d$.

Each of the cells is provided with a lens seating recess, formed concentrically with the periphery of the individual cell rim and preliminarily located axially with respect to the abutment shoulders of said rim, wherein the lenses are respectively and individually lodged and wherein each lens, whether single as the C and D lens or composite as the A and B lens, is "fine centered" (set absolutely co-axial) with respect to the periphery of the rim of its cell and secured in any suitable manner. It will be here observed, that although the lens recess in the cells for each of the A and B lenses is shown as a cylindrical bore having an abutment shoulder at one end, the lens recess for the C lens is a taper bore combining both elements in one surface and the D lens recess is substantially a compromise between the two.

The periphery $3^a$ of the A lens cells is a smooth cylindrical surface of a standardized uniform diametral dimension true both in axial and in angular directions. The same conditions also hold true as applied to the peripheries $3^b$, $3^c$ and $3^d$ of the B, C and D lens cells, excepting that the linear value of their peripheries with respect to that of the periphery of the A lens cell may be different and in the preferred embodiment shown the diameters of peripheries $3^b$, $3^c$ and $3^d$ although uniform for these three cells, are larger than is the corresponding diameter of the A lens cells. In other words, although standardized, they are standardized to a different standard from that applying to the A lens cell. It will later be clear that as many different standards for periphery diameters may be adopted as there are different type of cells or a single uniform diameter may under certain conditions be adopted for all cell periphery diameters.

Thus the mounting and centering of the various lenses in their cells with respect to the individual peripheries results in a number of lens member units each standardized with respect to concentricity and lateral dimensions. There still remains, however, the standardization of each unit with respect to the variation and center thickness of each individual lens.

To this end, the abutment shoulder $4^a$ on all A lens cells is trimmed off perpendicularly to the periphery $3^a$, to bring the linear distance, denoted by "standard 1," along the optical axis of the lens from the remote vertex, that is, the vertex $V_1$ of the outer concave surface of the A lens to the plane of the said abutment shoulder $4^a$ down to a standard linear dimensional value, (viz, "standard 1") after which the distance between the abutment shoulder $4^a$ and $5^a$ may be standardized; the abutment shoulder $4^b$ of the B lens cells is trimmed perpendicularly to the periphery of its cell to bring the plane of said abutment $4^b$ down to a standard distance "standard 2" measured along the lens axis to the adjacent vertex $V_2$ of the B lens and the abutment shoulder $5^b$ is trimmed to set its plane at a standard distance "standard 3" measured along the lens axis from the remote vertex, that is, the vertex $V_3$ of the outer concave surface of the B lens; the abutment shoulders $4^c$ and $5^c$ are similarly standardized with respect to the corresponding vertices of the C lens, that is, the abutment shoulder $4^c$ is trimmed perpendicularly to the periphery $3^c$ to set the plane of said shoulder at a standard distance "standard 4" measured along the lens axis from the vertex $V_4$ of the convex surface of the C lens and the abutment shoulder $5^c$ is trimmed perpendicularly to the cell periphery to set its plane to a standard distance "standard 5" measured along the lens axis from the vertex $V_5$ of the C lens' concave surface; and the abutment shoulder $4^d$ is trimmed perpendicularly to the periphery $3^d$ to set the plane of said shoulder at a standard distance "standard 6" measured along the lens axis from the adjacent vertex, that is, the vertex $V_6$ of the convex surface of the D lens; the shoulder $5^d$ of this lens cell like the shoulder $5^a$ of the A lens cell not being critical and being trimmed if desired to standardize the perpendicular distance between the shoulders $4^d$ and $5^d$.

A set of B, C and D lens units as above standardized may be selected at random from a multitude thereof, and combined into what may be termed the B, C and D or second section of the objective system by placing said units corresponding end to end in a smooth true cylindrical bore having the same internal diameter as the external diameter of said lens cells and retaining them therein.

To complete the lens system it is necessary to combine an A or first section therewith and to this end any A lens unit standardized as above may be selected at random from a multitude thereof and by placing this A lens in corresponding relation to the B lens of the second section with the axes of the said two sections coincident the residual errors of the system are adapted to be corrected by axially adjusting the separation space between the A and B lenses.

Therefore, a support or mounting is provided whereby each set of A, B, C and D lens units may be organized into a mounted lens system. The mounting providing a pair of coaxial and axially adjustable seating cavities, one for the first section and the other for the second section of the lens system, and provision is also made whereby one of said lens sections may be bodily adjusted axially within its seating cavity after the separation adjustment, that is, the extent of modification necessary in the axial distance of the A to B separation space, has been determined.

The mounting comprises a tubular casing made in two parts or sections, namely: the A piece or support 10 and the mounting sleeve 20 which is screw threaded on to the support 10 at 21 and which is provided with a shoulder 22 for abutting the shoulder 11 of the A piece when the sleeve is screwed into place in its normal position on its support. The threads 21 between the A piece and the sleeve co-operate to keep these two members co-axial at all times and when the sleeve is rotated the two members are moved axially without disturbing their co-axial alinement.

The seating cavity for the A lens or first section of the lens system, is formed in the A piece and includes a smooth true cylindrical bore 12 concentric with the threads 21 and of a standard internal diameter corresponding to the external diameter of an A lens cell periphery $3^a$. The bore is open at one end and is provided at its other end with an internal shoulder 13 arranged in standard relation to the shoulder 11. In the annular cavity thus formed, the rim of an A lens cell is held with its periphery contacting the bore 12 and its abutment $4^a$ thrust by means of the retaining ring 14 against the shoulder 13, or, as is contemplated and shown in the particular embodiment illustrated, against one of a set of spacing rings 15 each varying in thickness by a very small increment (say one hundredth of a millimeter) and adapted to be interposed between the abutment shoulders $4^a$ and 13. The retaining ring, whereby the cell $1^a$ is held in place, has a flange for bearing against the cell shoulder $5^a$ and a rim screw threaded at 16 to a reduced concentric portion of the A piece adjacent the open end of the bore 12 and intermediate the sleeve and the bore.

The seating cavity for the B, C and D lenses, that is, the cells of the second section of the lens system, also includes a smooth true cylindrical bore 23 concentric with the threads 21 and co-axial with the bore 12, which is of a standard internal diameter corresponding to the common external diameters of the peripheries $3^b$, $3^c$ and $3^d$. The bore 23 is also open at one end and is provided at its other end with an internal shoulder 24 arranged in standard relation to the sleeve shoulder 22. In the annular cavity thus formed, the rims of a set of B, C and D lens cells are ranged in line end to end with corresponding shoulders in contact, viz: $4^b$, to 24, $4^c$ to $5^b$ and $4^d$ to $5^c$ and with their peripheries in contact with the bore 23. These cell rims are held under compression against the abutment shoulder 24 and the cells are thus held in place, by a retaining ring 25 having a flange bearing against the shoulder $5^d$ of the D lens cell and a rim screw threaded at 26 to the outside of the sleeve wall surrounding the bore 23. The upper end of the rim of this sleeve enters an undercut annular recess 27 the outer wall of which covers the gap at the end of the threaded rim of the ring thus avoiding a dirt collecting groove and improving the appearance of the mounting.

A spacing ring such as 15 might be interposed between the shoulders $4^b$ and 24 as well as or instead of placing it between the shoulders $4^a$ and 13, but the location shown is preferable.

A lens system thus mounted organized and assembled, as shown, is examined for its optical performance, the particular spacing ring inserted being somewhat thicker than is estimated to be normal, and the mounting sleeve 20 is unthreaded until the desired correction is obtained by trial or inspection when the linear value of the axial movement of said sleeve with respect to the A piece is determined and a ring 15 thinner by this linear value is substituted for the original ring inserted.

To insure the proper seating of the shoulders or abutment surfaces 4ª, 4ᵇ, 5ᵇ, 4ᶜ, 5ᶜ and 4ᵈ and to facilitate the trimming of these surfaces, the portions of these shoulders intersecting their respective peripheries may be cut away as shown. This procedure will not only afford corner clearance, but will provide also the auxiliary retaining surfaces 6ª, 6ᵇ, 7ᵇ, 6ᶜ, 7ᶜ, and 6ᵈ for convenience in chucking the cells.

Having thus described our invention, what we claim and desire to secure by Letters Patent of the United States, is:

1. In a mounted lens system, a support comprising a pair of aligned tubular members detachably connected together and each having a lens cell positioning abutment, a plurality of lens cells fitted within the bores of said members to locate them concentrically of the optical axis, said cells being slidable longitudinally in said bores to adjust them longitudinally of said axis, and retaining rings for said members for holding said cells therein.

2. In a mounted lens system, a support comprising a pair of aligned tubular members each having an abutment for cooperation with the other and also an abutment for cooperation with a lens cell, a plurality of cells fitted within the bores of said members to position them concentric with the optical axis, abutments on said cells for positioning the same longitudinally of the optical axis, retaining means on each member for holding one or more cells in the bore thereof, and a removable spacing ring between said cell abutment of one of said members and the adjacent cell.

3. A mounted lens system embodying a support provided with a pair of alined cylindrical bores each having an abutment at one end disposed transversely to the axis of the bores, a plurality of lens cells adapted to be lodged end to end within the bores, each of said cells having a peripheral portion adapted to closely fit its respective bore and a pair of abutment ends adapted to engage with a corresponding abutment surface and means individual to each bore for retaining its lens cells therein with corresponding abutment surfaces in contact and axes in alinement.

4. A mounting for a lens system embodying a tubular support having at one end a lens seat consisting of an internal cylindrical bore open at one end and having at its other end an inwardly projecting abutment shoulder, a lens cell lodged in said seat having a peripheral portion closely fitting the lens seat bore and having a lens recess wherein a lens is mounted and centered with respect to said peripheral portion, an abutment shoulder disposed adjacent each end of the peripheral portions of the cell and extending inwardly with relation thereto, one or both of said shoulders being located with relation to the vertex of its lens, a retaining ring threaded to the support adjacent the open end of the seat bore for holding said cell toward the seat abutment and a tubular lens carrying extension mounted on the lens seat end of the support and in fixed relation thereto with its lens axis in alinement with the axis of said seat, means for adjusting the extension axially with respect to the support and without disturbing the mutual alinement of support and extension and means for effecting the axial adjustment of the cell in the lens seat.

5. In a mounted lens system, the combination with a casing comprising two mutually adjustable parts each provided with a seat consisting in a cylindrical bore having an abutment shoulder at one end and means for normally holding the two casing parts in fixed predetermined relation to one another, of a plurality of lenses and a cell individual to each lens wherein said lens is lodged, a seat engaging portion on each of said cells, said seat engaging portion comprising a cylindrical peripheral portion and a pair of opposed end shoulders the lens axis being set co-axial with the peripheral portion and the shoulders being located at standard distances from the respective lens vertex, means for holding all but one of the lens cells placed end to end in one seat, separate means for holding the other cell in the other seat and one of a set of substitutable spacing rings adapted to be interposed between a lens seat abutment and the adjacent lens cell shoulder.

EDMUND KANDLER.
JOHN C. SABEL.